United States Patent
Nagasaka

(10) Patent No.: US 10,569,136 B2
(45) Date of Patent: Feb. 25, 2020

(54) MOTION ANALYZING APPARATUS, MOTION ANALYZING METHOD, AND RECORDING MEDIUM

(71) Applicant: CASIO COMPUTER CO., LTD., Shibuya-ku, Tokyo (JP)

(72) Inventor: Tomoaki Nagasaka, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 170 days.

(21) Appl. No.: 15/832,435

(22) Filed: Dec. 5, 2017

(65) Prior Publication Data
US 2018/0169473 A1  Jun. 21, 2018

(30) Foreign Application Priority Data
Dec. 15, 2016 (JP) ................. 2016-243803

(51) Int. Cl.
*A63B 24/00* (2006.01)
*A63B 69/36* (2006.01)
*G06K 9/00* (2006.01)
*G09B 19/00* (2006.01)

(52) U.S. Cl.
CPC .......... *A63B 24/0006* (2013.01); *A63B 69/36* (2013.01); *G06K 9/00342* (2013.01); *G09B 19/0038* (2013.01); *A63B 2220/34* (2013.01); *A63B 2220/40* (2013.01)

(58) Field of Classification Search
None
See application file for complete search history.

(56) References Cited

U.S. PATENT DOCUMENTS

| | | | | |
|---|---|---|---|---|
| 9,694,267 B1* | 7/2017 | Thornbrue | ......... | G06K 9/00536 |
| 2005/0197198 A1* | 9/2005 | Otten | ................. | A63B 69/3614 |
| | | | | 473/221 |
| 2007/0111811 A1* | 5/2007 | Grober | ............... | A63B 69/3638 |
| | | | | 473/131 |

(Continued)

FOREIGN PATENT DOCUMENTS

| CN | 102814034 A | 12/2012 |
|---|---|---|
| JP | 2015178026 A | 10/2015 |

(Continued)

OTHER PUBLICATIONS

Chinese Office Action dated Jul. 1, 2019 (and English translation thereof) issued in counterpart Chinese Application No. 201711343556.0.

*Primary Examiner* — Tramar Y Harper
(74) *Attorney, Agent, or Firm* — Holtz, Holtz & Volek PC

(57) ABSTRACT

A motion analyzing apparatus 1 includes a data acquiring unit 51, a top detecting unit 52, an address detecting unit 53, a finish detecting unit 54, an axis correcting unit 55, a half detecting unit 56, and an impact detecting unit 57. The data acquiring unit 51 acquires motion information including an operation direction in a series of operations of a target object measured by a sensor unit. The top detecting unit 52 acquires a specific time point at which the operation direction of a target object is reversed in the motion information acquired by the data acquiring unit 51. The address detecting unit 53 or the finish detecting unit 54 specifies a start time point or an end time point of a series of operations by using a specific time point.

6 Claims, 13 Drawing Sheets

(56) References Cited

U.S. PATENT DOCUMENTS

| | | | | |
|---|---|---|---|---|
| 2009/0298605 | A1* | 12/2009 | Wiegers | A63B 57/00 473/199 |
| 2010/0049468 | A1* | 2/2010 | Papadourakis | A63B 69/00 702/141 |
| 2010/0194879 | A1* | 8/2010 | Pasveer | A61B 5/1127 348/135 |
| 2011/0054782 | A1* | 3/2011 | Kaahui | A61B 5/1107 701/532 |
| 2011/0305369 | A1* | 12/2011 | Bentley | G06K 9/00342 382/103 |
| 2012/0157241 | A1* | 6/2012 | Nomura | A63B 69/0002 473/422 |
| 2012/0316005 | A1* | 12/2012 | Shibuya | G09B 19/003 473/212 |
| 2013/0102419 | A1* | 4/2013 | Jeffery | G09B 19/0038 473/409 |
| 2013/0260923 | A1* | 10/2013 | Okazaki | A63B 60/42 473/409 |
| 2014/0229135 | A1* | 8/2014 | Nomura | G01P 21/00 702/94 |
| 2015/0283427 | A1* | 10/2015 | Shibuya | G09B 19/0038 700/91 |
| 2015/0367174 | A1* | 12/2015 | Okazaki | A63B 24/0003 473/409 |
| 2016/0089568 | A1 | 3/2016 | Shibuya | |
| 2017/0028282 | A1* | 2/2017 | Ito | G06Q 10/0639 |
| 2017/0144022 | A1* | 5/2017 | Glenn | A63B 53/04 |
| 2017/0215771 | A1 | 8/2017 | Sayo et al. | |

FOREIGN PATENT DOCUMENTS

| | | |
|---|---|---|
| JP | 2016036681 A | 3/2016 |
| JP | 2016067410 A | 5/2016 |

* cited by examiner

MOTION ANALYZING APPARATUS, MOTION ANALYZING METHOD, AND RECORDING MEDIUM

This application is based upon and claims the benefit of priority under 35 USC 119 of Japanese Patent Application No. 2016-243803 filed on Dec. 15, 2016, the entire disclosure of which, including the description, claims, drawings, and abstract, is incorporated herein by reference in its entirety.

BACKGROUND OF THE INVENTION

Field of the Invention

The present invention relates to a motion analyzing apparatus, a motion analyzing method, and a recording medium.

Related Art

Conventionally, like Japanese Unexamined Patent Application Publication No. 2015-178026, there are motion analyzing technologies for detecting an impact in swing data of golf played by a user and detecting the range of a swing operation performed by a target person using the time point of the detected impact as a reference.

SUMMARY OF THE INVENTION

A motion analyzing apparatus according to one aspect of the present invention comprising: a processor, wherein the processor executes: a motion information acquiring process acquiring motion information including an operation direction in a series of operations of a target object measured by a sensor unit; a specific time point acquiring process acquiring a specific time point at which the operation direction of the target object is reversed in the motion information acquired in the motion information acquiring process; and a specifying process specifying a start time point or an end time point of the series of operations by using the specific time point. A motion analyzing method according to one aspect of the present invention is performed by a motion analyzing apparatus, the motion analyzing method comprising: a motion information acquiring process acquiring motion information including an operation direction in a series of operations of a target object measured by a sensor unit; a specific time point acquiring process acquiring a specific time point at which the operation direction of the target object is reversed in the motion information acquired in the motion information acquiring process; and a specifying process specifying a start time point or an end time point of the series of operations by using the specific time point. A non-transitory recording medium according to one aspect of the present invention that is a storage medium storing a computer-readable program controlling a motion analyzing apparatus, the program causing a processor to execute: a motion information acquiring process acquiring motion information including an operation direction in a series of operations of a target object measured by a sensor unit; a specific time point acquiring process acquiring a specific time point at which the operation direction of the target object is reversed in the motion information acquired in the motion information acquiring process; and a specifying process specifying a start time point or an end time point of the series of operations by using the specific time point.

DETAILED DESCRIPTION OF THE INVENTION

Hereinafter, embodiments of the present invention will be described with reference to the drawings.

Embodiment

[Configuration]

Figure 1:
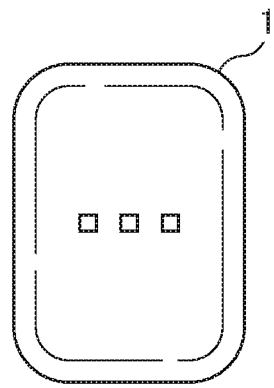
FIG. 1 is a schematic diagram that illustrates the external configuration of a motion analyzing apparatus according to an embodiment of the present invention.
Figure 2:
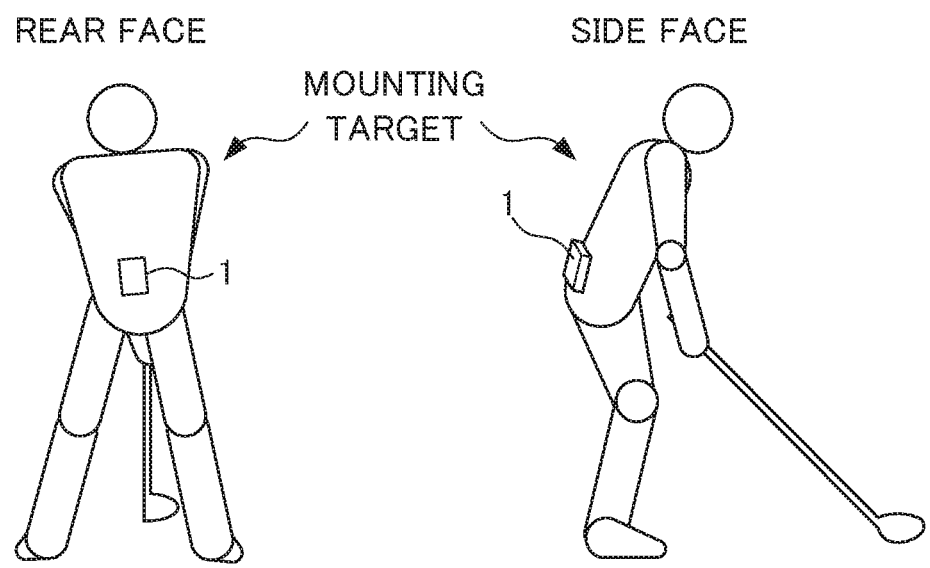
FIG. 2 is a schematic diagram that illustrates an example of the use form of the motion analyzing apparatus.

FIG. 1 is a schematic diagram that illustrates the external configuration of a motion analyzing apparatus 1 according to an embodiment of the present invention. FIG. 2 is a schematic diagram that illustrates an example of the use form of the motion analyzing apparatus 1. The motion analyzing apparatus 1 at least has a sensing function for sensing the operation of a mounting target, an analysis function for specifying a series of operations and each operation included in the series of operations by analyzing sensor information, and a communication function for transmitting sensed data (hereinafter, referred to as "sensor information") or an analysis result to the outside. In this embodiment, the motion analyzing apparatus 1 is mounted near the waist of a person who takes a golf swing, and a series of operations in the swing is sensed as operations of a mounting target.

In this embodiment, the motion analyzing apparatus 1 specifies a series of operations of a swing and each operation such as an address, a top, a half, an impact, and a finish configuring the swing through an analysis. Here, the address represents immediately before the start of take-back, the top represents a point at which switching from a back swing to a down swing is performed, the half represents a position at which a shaft is in the horizontal direction in the middle of a down swing, the impact represents a moment at which a club is brought into contact with a ball, and the finish represents a point at which switching to a normal posture after follow-through is performed. In a case where the direction of a forward swing is set as positive, and the angular velocity around the vertical axis of the mounting target is used as the reference, the address is immediately before a transition from near zero to a negative value, the top is a point at which switching from a negative value to a positive value is performed, the half is near a maximum value, the impact is a position that is slightly after the maximum value, and the finish is a point at which switching from a positive value to near zero or a negative value is performed.

Figure 3:
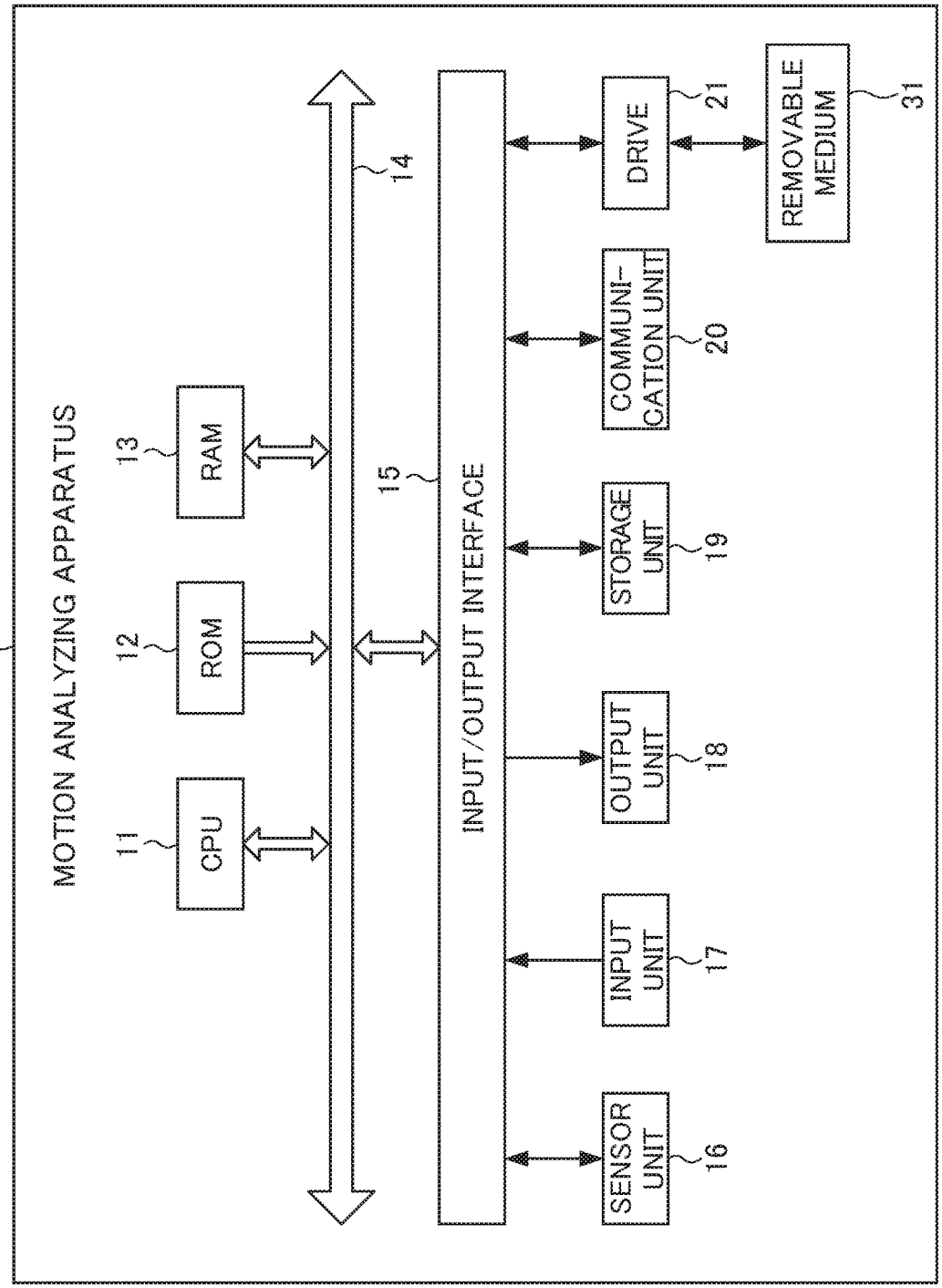
FIG. 3 is a block diagram that illustrates the hardware configuration of a motion analyzing apparatus according to an embodiment of the present invention.

FIG. 3 is a block diagram showing the hardware configuration of the motion analyzing apparatus 1 according to an embodiment of the present invention. The portable terminal 1 includes a central processing unit (CPU) 11, a read only memory (ROM) 12, a random access memory (RAM) 13, a bus 14, an input-output interface 15, a sensor unit 16, an input unit 17, an output unit 18, a storage unit 19, a communication unit 20, and a drive 21.

The CPU 11 executes various types of processing according to a program stored in the ROM 12 or a program loaded from the storage unit 19 into the RAM 13.

Data, etc. required upon the CPU 11 executing the various processing is stored in the RAM 13 as appropriate.

The CPU 11, ROM 12 and RAM 13 are connected to each other via the bus 14. In addition, the input/output interface 15 is also connected to this bus 14. The input-output interface 15 is further connected to the sensor unit 16, the input unit 17, the output unit 18, the storage unit 19, the communication unit 20, and the drive 21.

The sensor unit 16 is configured by various sensors such as a tri-axial acceleration sensor, a tri-axial angular velocity sensor, a tri-axial geomagnetic sensor, and the like and, at least, detects acceleration, an angular velocity, and geomagnetism of tri-axial directions generated in the motion analyzing apparatus 1 in accordance with a user's operation and outputs the acceleration, the angular velocity, and the geomagnetism as sensor information. In this embodiment, the sampling rate of sensing performed by the sensor unit 16 is set to 200 Hz.

The input unit 17 is configured by various buttons and the like, and inputs a variety of information in accordance with instruction operations by the user. The output unit 18 is configured by the display unit, a speaker, and the like, and outputs images and sound. The storage unit 19 is configured by DRAM (Dynamic Random Access Memory) or the like, and stores data of various images. The communication unit 20 controls communication with a different apparatus (not shown in the drawings) via a network including the Internet.

A removable medium 31 composed of a magnetic disk, an optical disk, a magneto-optical disk, semiconductor memory or the like is installed in the drive 21, as appropriate. Programs that are read via the drive 21 from the removable medium 31 are installed in the storage unit 19, as necessary. Similarly to the storage unit 19, the removable medium 31 can also store a variety of data such as the image data stored in the storage unit 19.

[Functional Configuration]

Figure 4:
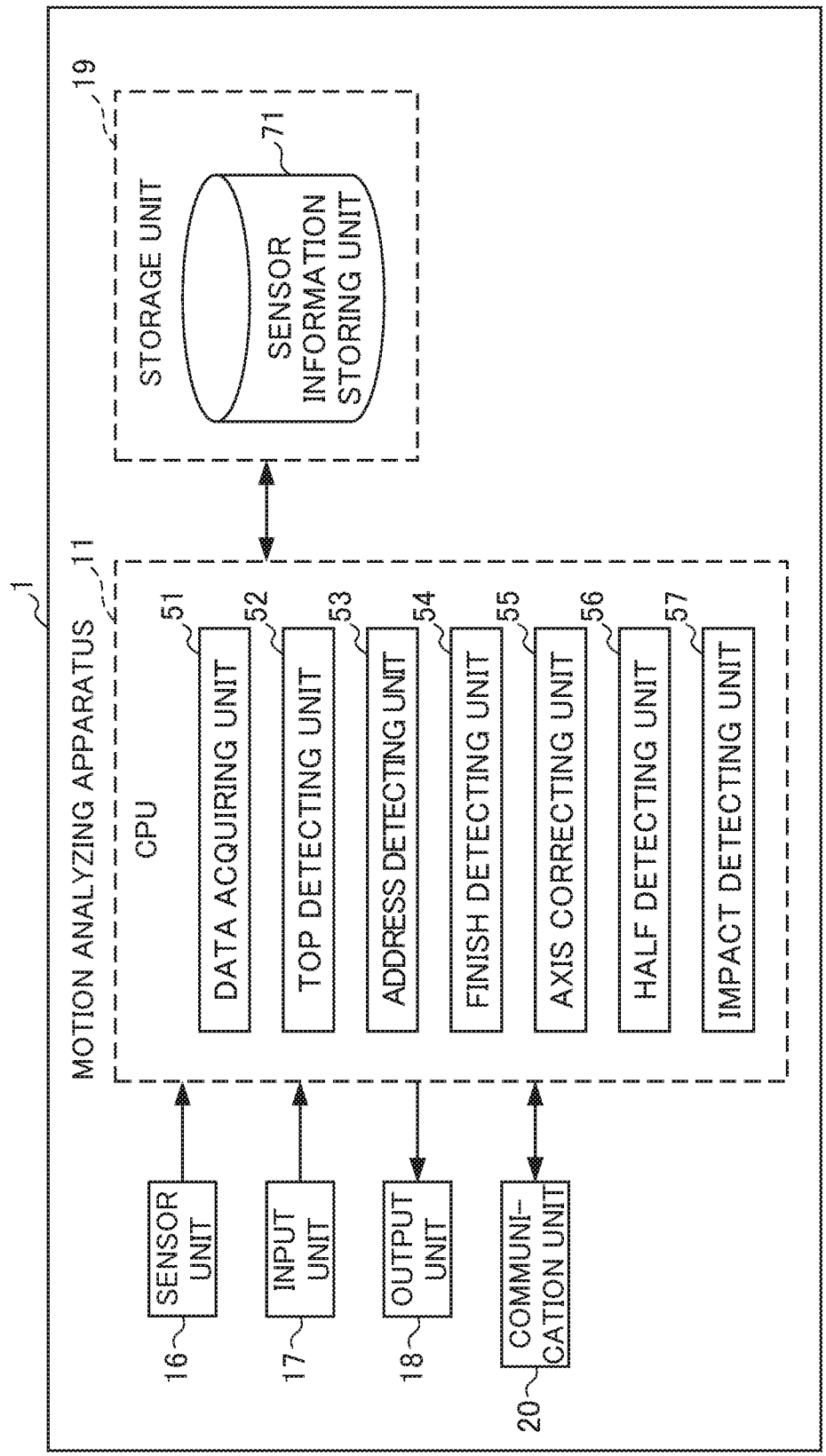
FIG. 4 is a functional block diagram that illustrates a functional configuration for performing a motion analyzing process included in the functional configuration of the motion analyzing apparatus.
Figure 5:
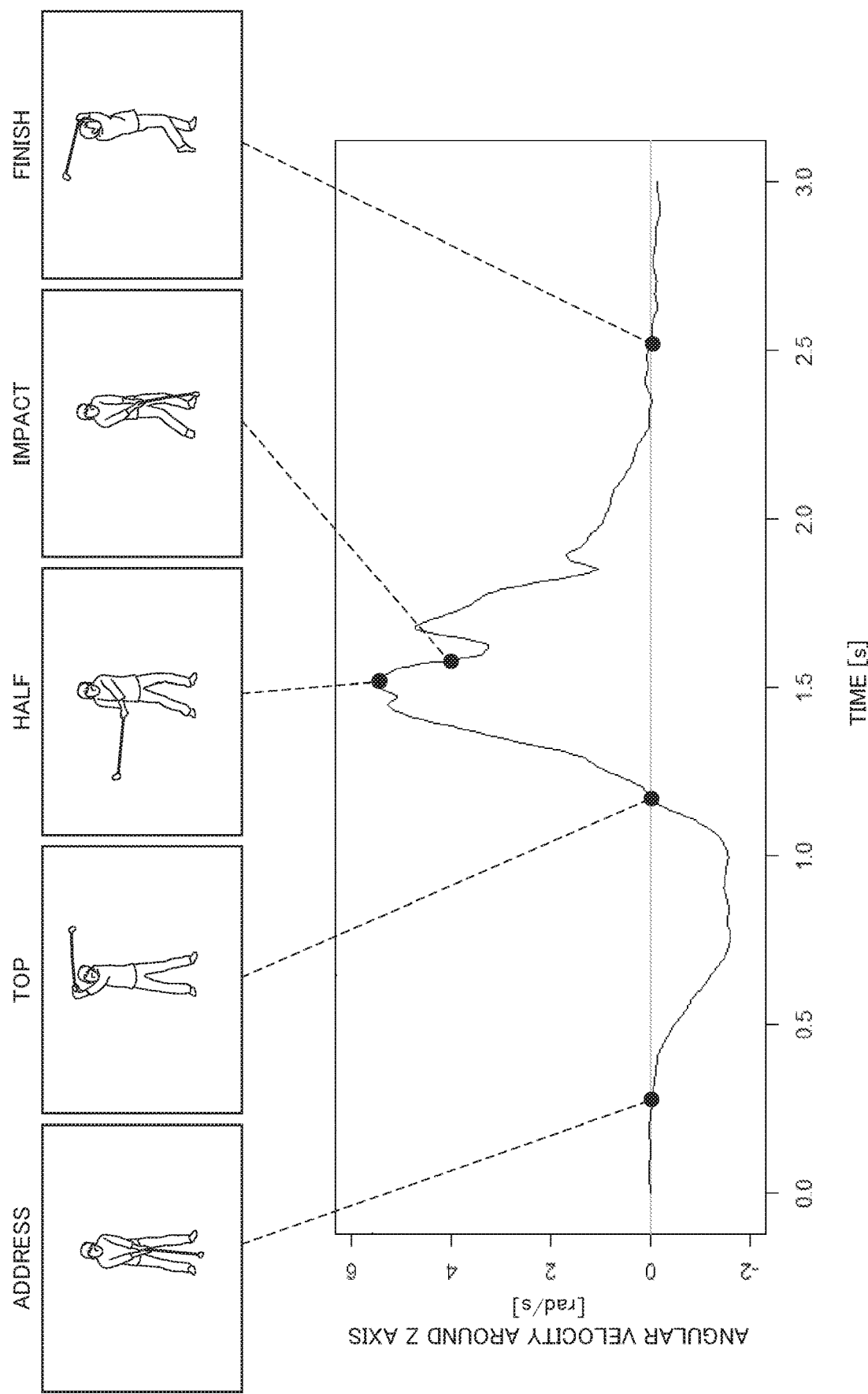
FIG. 5 is a schematic diagram that illustrates an example of a sensing result around the Z axis in the motion of a mounting target.
Figure 6:
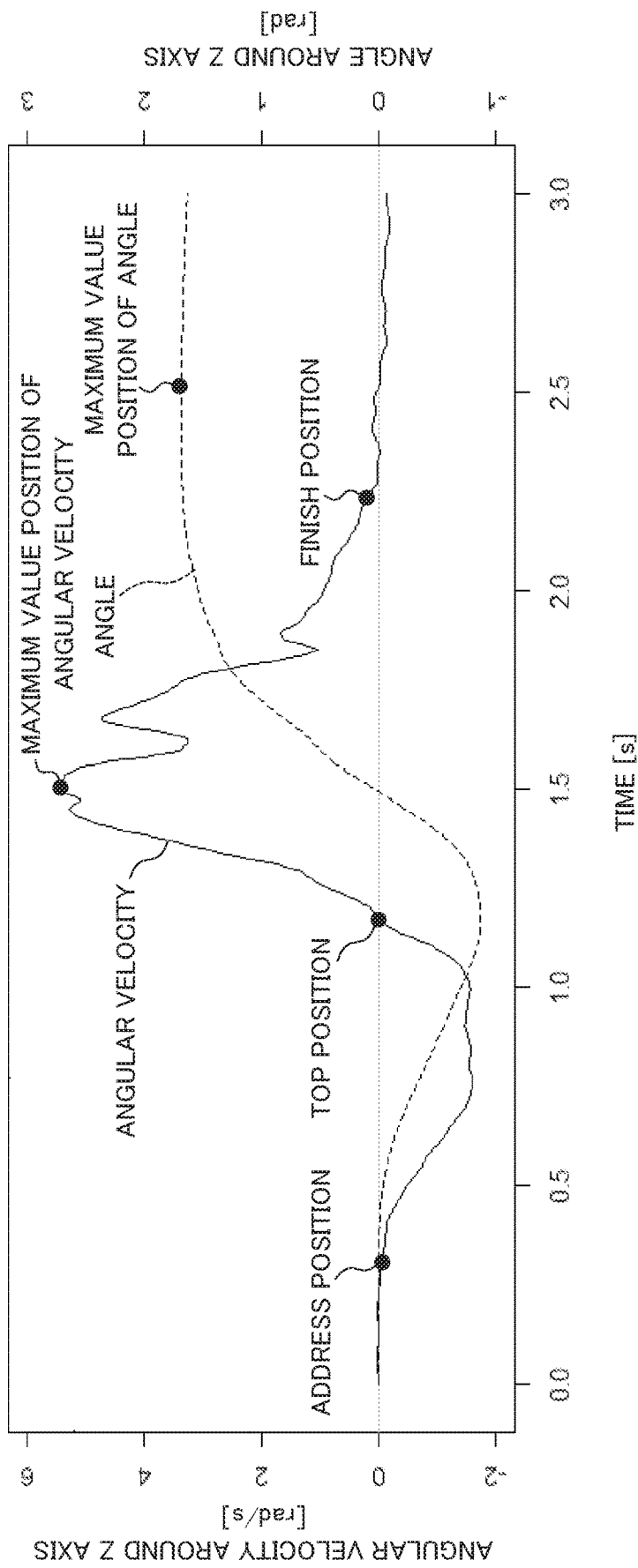
FIG. 6 is a schematic diagram that illustrates angular velocity and an angle around the Z axis in the motion of a mounting target.
Figure 7:
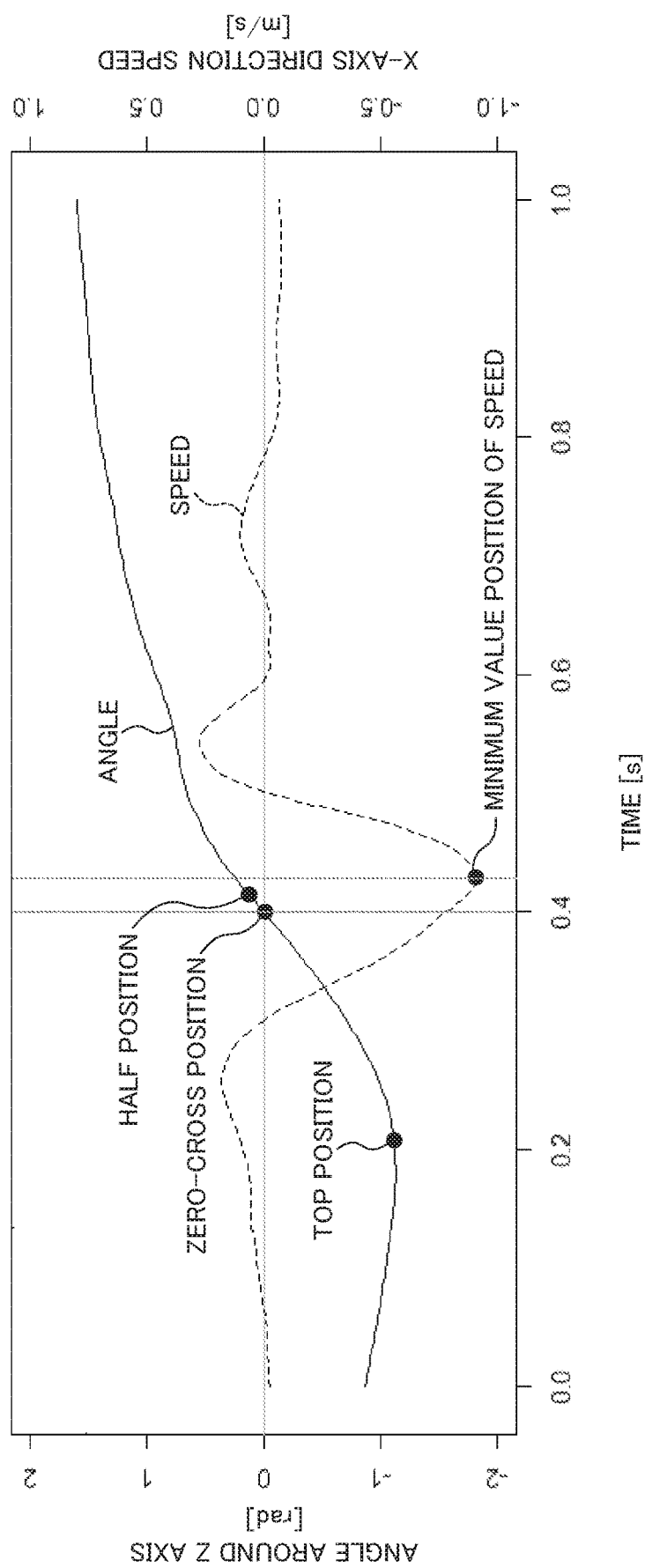
FIG. 7 is a schematic diagram that illustrates an angle around the Z axis and an X-axis direction speed in the motion of a mounting target.
Figure 8:
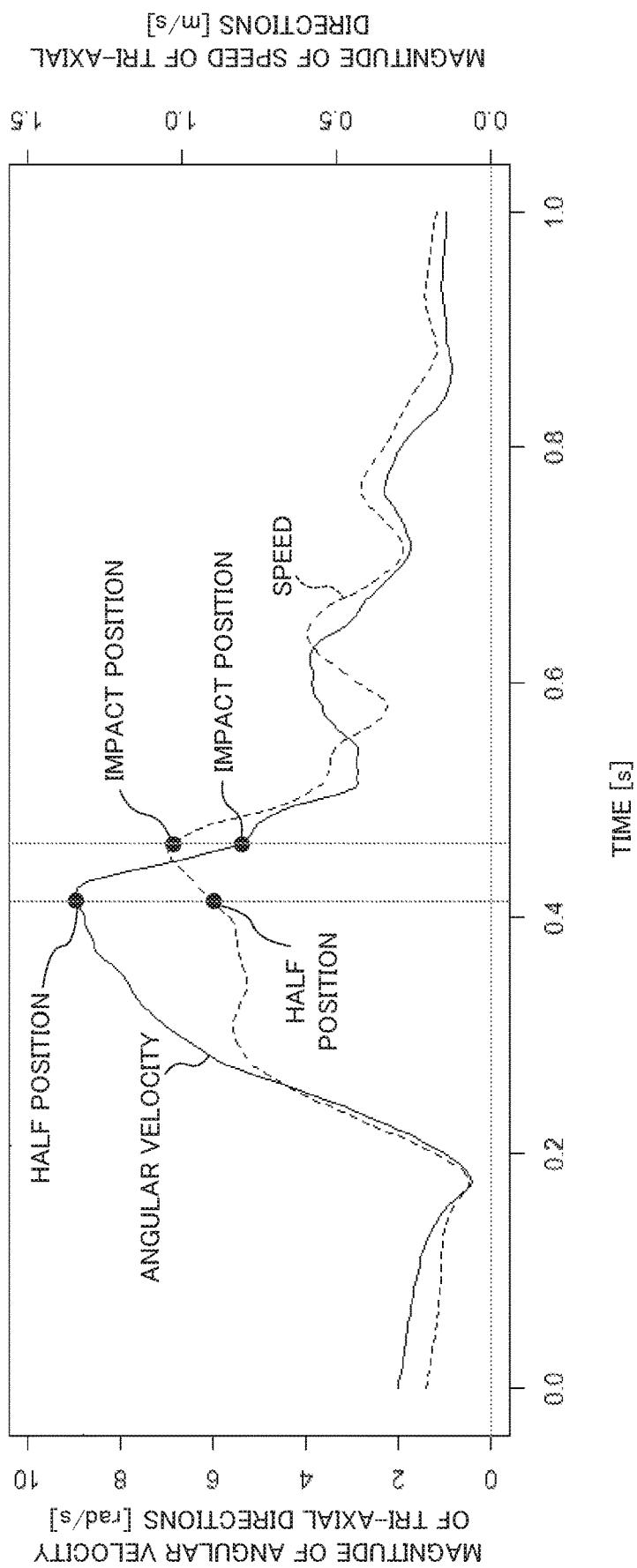
FIG. 8 is a schematic diagram that illustrates the magnitudes of angular velocity and speed in the tri-axial directions in the motion of a mounting target.

FIG. 4 is a functional block diagram that illustrates a functional configuration for performing a motion analyzing process included in the functional configuration of the motion analyzing apparatus 1. FIG. 5 is a schematic diagram that illustrates an example (angular velocity around the Z axis) of a sensing result around the Z axis in the motion (here, a golf swing) of a mounting target, FIG. 6 is a schematic diagram that illustrates angular velocity and an angle around the Z axis in the motion of the mounting target, FIG. 7 is a schematic diagram that illustrates an angle around the Z axis and an X-axis direction speed in the motion of the mounting target, and FIG. 8 is a schematic diagram that illustrates the magnitudes (norm) of angular velocity and speed in the tri-axial directions in the motion of the mounting target. In FIGS. 5 to 8, the positions of time points of the address, the top, the half, the impact, and the finish are appropriately illustrated. In addition, in FIGS. 7 and 8, graphs cutting a part of a swing are illustrated.

A motion analyzing process is a series of processes of analyzing the motion (here, a golf swing) of a mounting target on the basis of sensor information sensed by the motion analyzing apparatus 1 in a series of operations of the mounting target. Hereinafter, while a case where the mounting target is right-handed will be described as an example, in the case where the mounting target is left-handed, the process may be performed with the coordinates horizontally reversed. In a case where the motion analyzing process is performed, as illustrated in FIG. 4, in the CPU 11, a data acquiring unit 51, a top detecting unit 52, an address detecting unit 53, a finish detecting unit 54, an axis correcting unit 55, a half detecting unit 56, and an impact detecting unit 57 function. In addition, in one area of the storage unit 19, a sensor information storing unit 71 is set. In the sensor information storing unit 71, in a series of operations in a swing, each data (sensor information) of tri-axial directions representing detection results of various sensors acquired by the data acquiring unit 51 is stored in a time series.

The data acquiring unit 51, for a series of operations in a swing, acquires data (sensor information) representing detection results of tri-axial directions from each of the tri-axial acceleration sensor, the tri-axial angular velocity sensor, and the tri-axial geomagnetism sensor of the sensor unit 16. Then, the data acquiring unit 51 stores the acquired sensor information in the sensor information storing unit 71 in a time series.

The top detecting unit 52 detects a top position in a swing by performing a top detecting process to be described later. More specifically, as illustrated in FIG. 6, the top detecting unit 52 acquires a time point (a maximum-value position of the angular velocity) at which the angular velocity around the Z axis has a maximum value in the sensor information representing a series of operations in a swing. Then, the top detecting unit 52 sequentially subtracts an index (a value set in advance) of a time from the acquired time point (the maximum value position of the angular velocity) of the maximum value and detects a time point at which the angular velocity around the Z axis is zero or less as a top position. In this way, a position at which the sign of the angular velocity around the Z axis is inverted when going back from near the half at which the angular velocity around the Z axis is maximum is detected as a switchback point (in other words, the top position) between a down swing and a back swing. In addition, the value of the index may be appropriately set based on actual values and the like.

The address detecting unit 53 detects an address position in a swing by performing an address detecting process to be described later. More specifically, as illustrated in FIG. 6, the address detecting unit 53 sequentially subtracts an index of a time from a time point that is returned by a predetermined time (for example, 0.3 seconds) set in advance from the top position detected by the top detecting unit 52 and detects a time point at which the angular velocity around the Z axis is a first threshold (for example, −0.3 [rad/s]) set in advance or more as an address position. In this way, a position at which the angular velocity around the Z axis is almost zero when going back from near the top position is detected as a position at which take-back is started. At this time, by doing a search from the top side instead of doing a search from the start of a series of data representing a swing, it can be prevented to erroneously detect a delicate motion of the mounting target before take-back, and an address position can be reliably detected. The first threshold may be appropriately set based on actual values and the like.

The finish detecting unit 54 detects a finish position in a swing by performing a finish detecting process to be described later. More specifically, as illustrated in FIG. 6, the finish detecting unit 54 integrates the angular velocity around the Z axis from the start of a series of data representing a swing to calculate an angle around the Z axis of each time point and acquires a time point (a maximum value position of the angle) at which the angle around the Z axis has a maximum value. Then, the finish detecting unit 54 sequentially subtracts an index of a time from the time point (the maximum value position of the angle) at which the angle around the Z axis has a maximum value and detects a time point at which the angular velocity around the Z axis is a second threshold (for example, 0.3 [rad/s]) set in advance or more as a finish position. In this way, the end of follow-through corresponds to the maximum value position of the angle around the Z axis, and, thus, by determining the convergence of the angular velocity by going back from that position, a redundant determination process for determining stop at the finish position and the like is suppressed, and a position at which the motion can be regarded as being converged can be detected.

Figure 9:
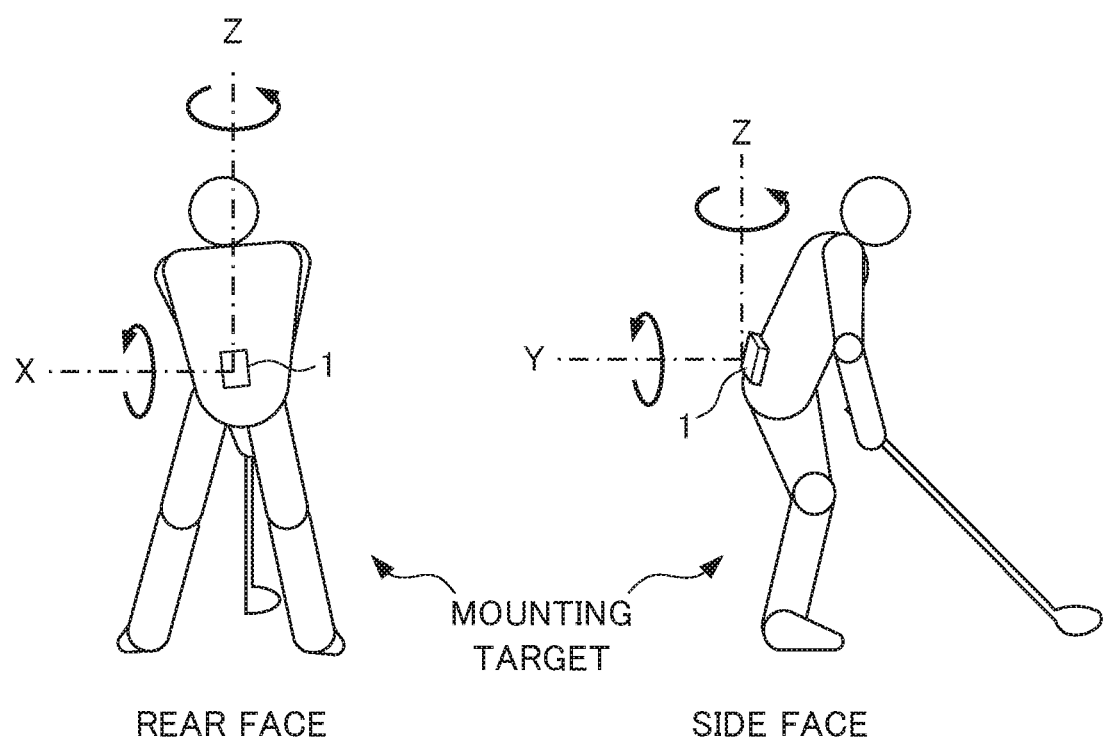
FIG. 9 is a schematic diagram that illustrates tri-axial directions corrected by an axis correcting unit.

The axis correcting unit 55 corrects data (motion data) representing the motions of a mounting target from a geomagnetism sensing result with a horizontal axis having the left-hand side of the mounting target at the time point of the address as being positive set as an X axis and a horizontal axis having the rear face side as being positive set as a Y axis. FIG. 9 is a schematic diagram that illustrates tri-axial directions corrected by the axis correcting unit 55. While the Z-axis direction can be set from the start by setting a direction opposite to the gravity direction as being positive, for the X axis and the Y axis in the horizontal direction, the reference needs to be set. For this reason, as illustrated in FIG. 6, the X axis and the Y axis are set by using the posture of the address time point as the reference by the axis correcting unit 55. In accordance with the setting of the coordinate axes of the horizontal direction using the axis correcting unit 55, sensor information corresponding to the horizontal direction is corrected to be coordinates values having the X axis and the Y axis as references.

The half detecting unit 56 detects a half position in a swing by performing a half detecting process to be described later. More specifically, as illustrated in FIG. 7, the half detecting unit 56 sequentially adds an index of a time from the time point of the top position detected by the top detecting unit 52 and sets a time point at which the angle around the Z axis is zero or more as a zero-cross position of the angle around the Z axis. In addition, the half detecting unit 56 acquires a minimum value of the speed of the X-axis direction and a time point thereof (the minimum value position of the speed). Then, the half detecting unit 56, in a case where the absolute value of a difference between the minimum value position of the X-axis direction speed and the zero-cross position of the angle around the Z axis is within a threshold time (for example, 0.08 [s]) set in advance, and the minimum value of the X-axis direction speed is a threshold (for example, −0.2 [m/s]) of the speed or less, detects center between the zero-cross position of the angle around the Z axis and the minimum value position of the X-axis direction speed as a half position and, in the other cases, detects the zero-cross position of the angle around the Z axis as a half position. In this way, on the basis of a general trend of a golf swing, a time point at which the body faces the front side in the middle of a down swing can be detected as a half position, and, in a case where there is a clear peak of the speed of the waist on the right-hand side, a half position can be detected by being shifted from the time point at which the body faces the front side to the side of the peak.

The impact detecting unit 57 detects an impact position in a swing by performing an impact detecting process to be described later. More specifically, as illustrated in FIG. 8, the impact detecting unit 57 acquires the magnitude (GyrN) of the angular velocity of each of the tri-axial directions and the magnitude (VelocityN) of the speed of each of the tri-axial directions at the half position detected by the half detecting unit 56. Then, the impact detecting unit 57 detects a value calculated using the following Equation (1) as an impact position.

$$\text{Impact position} = a + b \times GyrN + c \times VelocityN + d \times GyrN \times VelocityN + \text{half position} \quad (1)$$

As the coefficients a to d, in a case where the sampling frequency of each sensor is 200 Hz, for example, the following values may be used.
a=0.091946, b=−0.007648, c=−0.004681, and d=0.003174
In this way, it can be understood that the speed and the angular velocity at the half position have significant influences on a time of the half to the impact.

[Operation]

Figure 10:
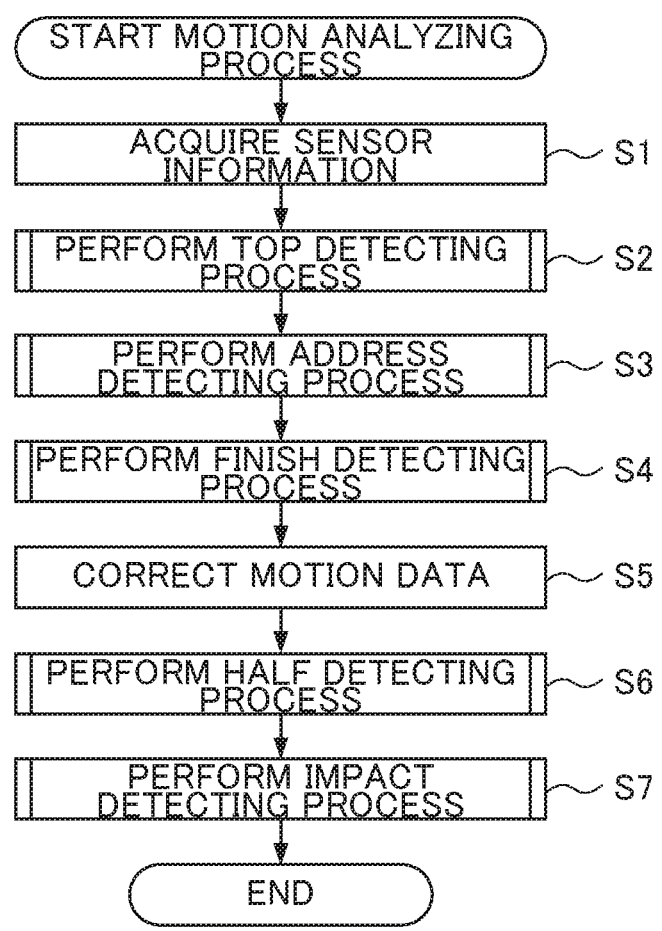
FIG. 10 is a flowchart that describes the flow of a motion analyzing process performed by the motion analyzing apparatus, which is illustrated in FIG. 1, having the functional configuration illustrated in FIG. 4.

Next, the operation of the motion analyzing apparatus 1 will be described. FIG. 10 is a flowchart that describes the flow of the motion analyzing process performed by the motion analyzing apparatus 1, which is illustrated in FIG. 1, having the functional configuration illustrated in FIG. 4. The motion analyzing process is started by an operation instructing the start of the motion analyzing process through the input unit 17.

In Step S1, the data acquiring unit 51, for a series of operations in a swing, acquires data (sensor information) representing detection results of tri-axial directions from each of the tri-axial acceleration sensor, the tri-axial angular velocity sensor, and the tri-axial geomagnetism sensor of the sensor unit 16. The sensor information acquired here is stored in the sensor information storing unit 71 in a time series. In Step S2, the top detecting unit 52 detects a top position in a swing by performing the top detecting process.

In Step S3, the address detecting unit 53 detects an address position in a swing by performing the address detecting process. In Step S4, the finish detecting unit 54 detects a finish position in a swing by performing the finish detecting process. In Step S5, the axis correcting unit 55 corrects data (motion data) representing the motions of a mounting target from a geomagnetism sensing result with a horizontal axis having the left-hand side of the mounting target at the time point of the address as being positive set as an X axis and a horizontal axis having the rear face side as being positive set as a Y axis.

In Step S6, the half detecting unit 56 detects a half position in a swing by performing the half detecting process. In Step S7, the impact detecting unit 57 detects an impact position in a swing by performing the impact detecting process. After Step S7, the motion analyzing process ends. An analysis result acquired by the motion analyzing process may be displayed on a display of the output unit 18 or be transmitted to another apparatus through the communication unit 20 to be displayed therein.

Figure 11:
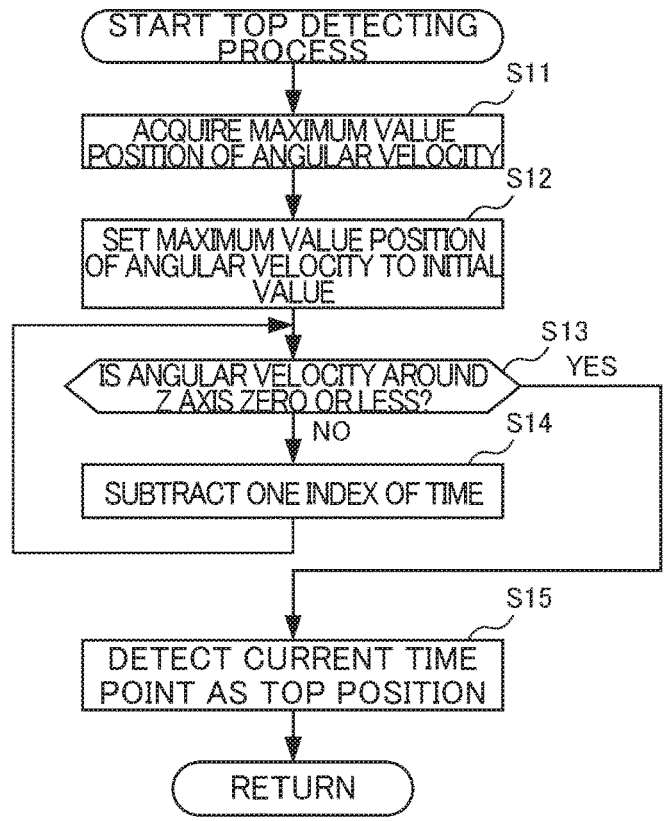
FIG. 11 is a flowchart that describes the flow of a top detecting process.

Next, the top detecting process performed in Step S2 of the motion analyzing process will be described. FIG. 11 is a flowchart that describes the flow of the top detecting process. In Step S11, the top detecting unit 52 acquires a time point (a maximum value position of angular velocity) at which the angular velocity around the Z axis has a maximum value in the sensor information representing a series of operations in a swing. In Step S12, the top detecting unit 52 sets the maximum value position of the angular velocity as an initial value from which an index of a time is subtracted.

In Step S13, the top detecting unit 52 determines whether or not the angular velocity around the Z axis at the current time point is zero or less. In a case where the angular velocity around the Z axis at the current time point is not zero or less, "No" is determined in Step S13, and the process proceeds to Step S14. On the other hand, in a case where the angular velocity around the Z axis at the current time point is zero or less, "Yes" is determined in Step S14, and the process proceeds to Step S15.

In Step S14, the top detecting unit 52 subtracts one index of the time from the time point. After Step S14, the process proceeds to Step S13. In Step S15, the top detecting unit 52 detects the current time point as a top position. After Step S15, the process is returned to the motion analyzing process.

Figure 12:
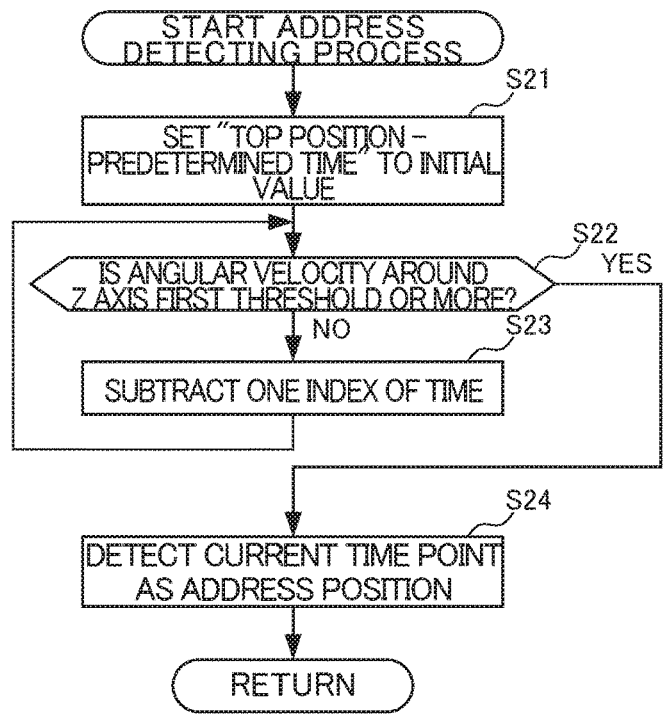
FIG. 12 is a flowchart that describes the flow of an address detecting process.

Next, the address detecting process performed in Step S3 of the motion analyzing process will be described. FIG. 12 is a flowchart that describes the flow of the address detecting process. In Step S21, the address detecting unit 53 sets a time point returned from the top position detected by the top detecting unit 52 by a predetermined time (for example, 0.3 seconds) set in advance as an initial value from which the index of the time is subtracted. In Step S22, the address detecting unit 53 determines whether or not the angular velocity around the Z axis at the current time point is a first threshold (for example, −0.3 [rad/s]) set in advance or more. In a case where the angular velocity around the Z axis at the current time point is not the first threshold set in advance or more, "No" is determined in Step S22, and the process proceeds to Step S23. On the other hand, in a case where the angular velocity around the Z axis at the current time point is the first threshold set in advance or more, "Yes" is determined in Step S22, and the process proceeds to Step S24. In Step S23, the address detecting unit 53 subtracts one index of the time from the time point. After Step S23, the process proceeds to Step S22. In Step S24, the address detecting unit 53 detects the current time point as an address position. After Step S24, the process is returned to the motion analyzing process.

Figure 13:
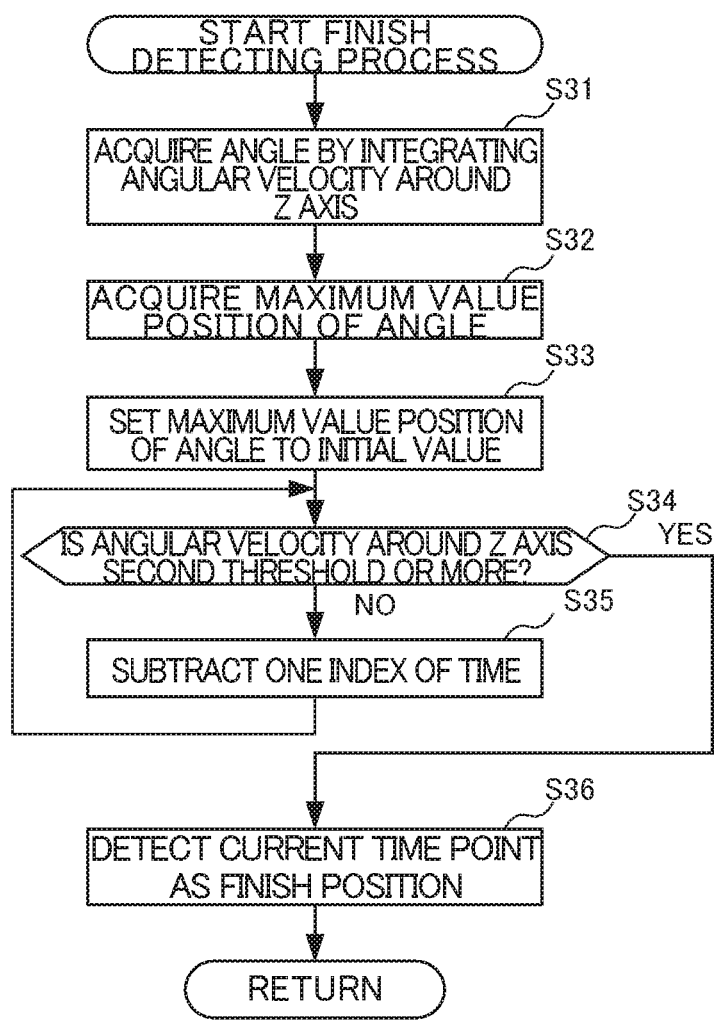
FIG. 13 is a flowchart that describes the flow of a finish detecting process.

Next, the finish detecting process performed in Step S4 of the motion analyzing process will be described. FIG. 13 is a flowchart that describes the flow of the finish detecting process. In Step S31, the finish detecting unit 54 integrates the angular velocity around the Z axis from the start of a series of data representing a swing to calculate the angle around the Z axis at each time point. In Step S32, the finish detecting unit 54 acquires a time point (the maximum value position of the angle) at which the angle around the Z axis has a maximum value.

In Step S33, the finish detecting unit 54 sets the time point (the maximum value position of the angle) at which the angle around the Z axis has a maximum value as an initial value from which the index of the time is subtracted. In Step S34, the finish detecting unit 54 determines whether or not the angular velocity around the Z axis at the current time point is a second threshold (for example, 0.3 [rad/s]) set in advance or more. In a case where the angular velocity around the Z axis at the current time point is not the second threshold set in advance or more, "No" is determined in Step S34, and the process proceeds to Step S35. On the other hand, in a case where the angular velocity around the Z axis at the current time point is the second threshold set in advance or more, "Yes" is determined in Step S34, and the process proceeds to Step S36.

In Step S35, the finish detecting unit 54 subtracts one index of the time from the time point. After Step S35, the process proceeds to Step S34. In Step S36, the finish detecting unit 54 detects the current time point as a finish position. After Step S36, the process is returned to the motion analyzing process.

Figure 14:
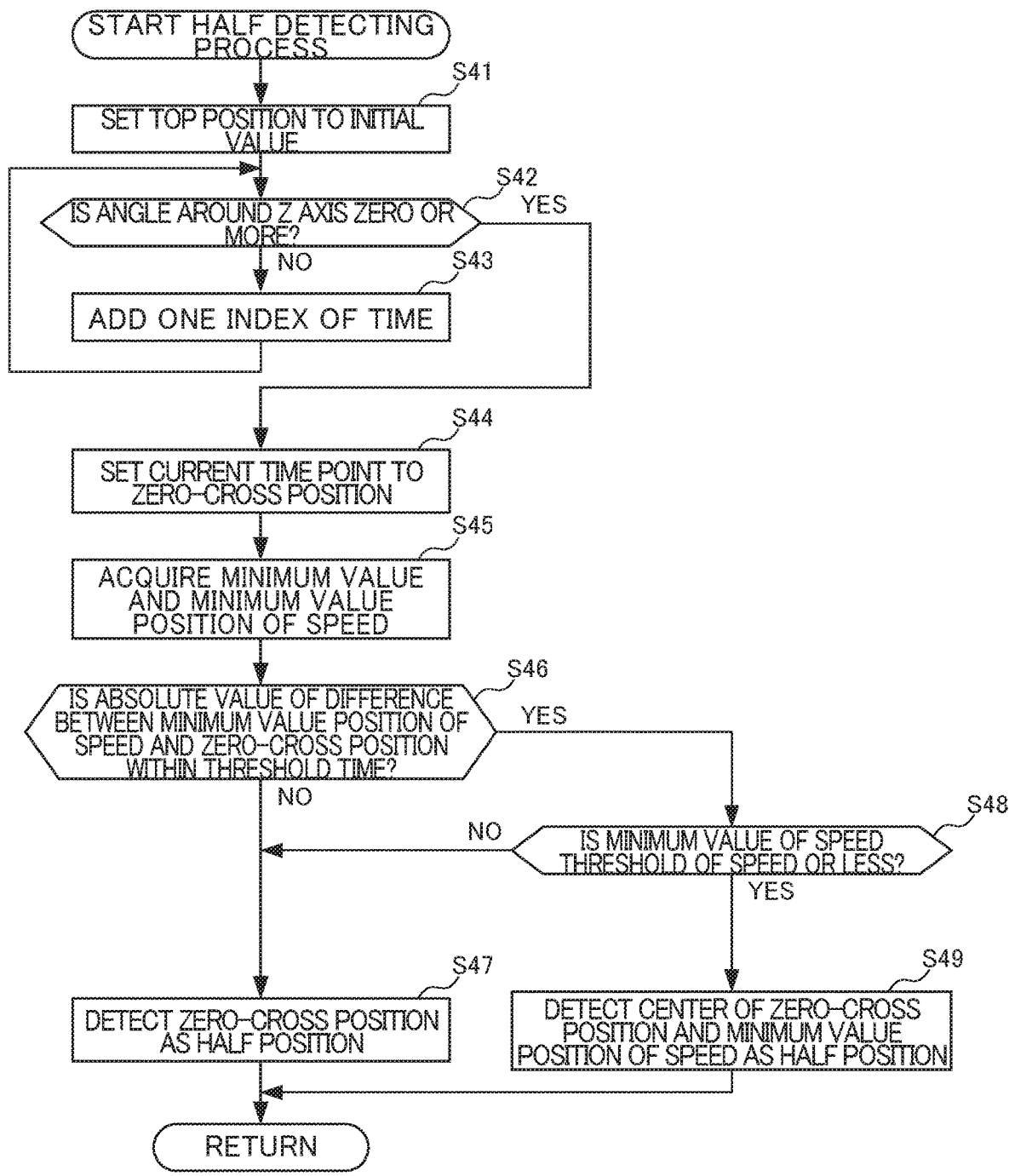
FIG. 14 is a flowchart that describes the flow of a half detecting process.

Next, the half detecting process performed in Step S6 of the motion analyzing process will be described. FIG. 14 is a flowchart that describes the flow of the half detecting process. In Step S41, the half detecting unit 56 sets the top position as an initial value from which an index of a time is subtracted.

In Step S42, it is determined whether or not the angle around the Z axis at the current time point is zero or more. In a case where the angle around the Z axis at the current time point is not zero or more, "No" is determined in Step S42, and the process proceeds to Step S43. On the other hand, in a case where the angle around the Z axis at the current time point is zero or more, "Yes" is determined in Step S42, and the process proceeds to Step S44.

In Step S43, the half detecting unit 56 adds one index of the time to the time point. After Step S43, the process proceeds to Step S42. In Step S44, the half detecting unit 56 sets the current time point as a zero-cross position of the angle around the Z axis. In Step S45, the half detecting unit 56 acquires a minimum value and the time point (the minimum-value position of the speed) of the speed in the X-axis direction.

In Step S46, the half detecting unit 56 determines whether or not the absolute value of a difference between the minimum value position of the X-axis direction speed and the zero-cross position of the angle around the Z axis is within a threshold time (for example, 0.08 [s]) set in advance. In a case where the absolute value of a difference between the minimum value position of the X-axis direction speed and the zero-cross position of the angle around the Z axis is not within the threshold time set in advance, "No" is determined in Step S46, and the process proceeds to Step S47. On the other hand, in a case where the absolute value of a difference between the minimum value position of the X-axis direction speed and the zero-cross position of the angle around the Z axis is within the threshold time set in advance, "Yes" is determined in Step S46, and the process proceeds to Step S48.

In Step S47, the half detecting unit 56 detects the zero-cross position of the angle around the Z axis as a half position. In Step S48, the half detecting unit 56 determines whether or not the minimum value of the X-axis direction speed is a threshold (for example, −0.2 [m/s]) of the speed or less. In a case where the minimum value of the X-axis direction speed is not the threshold of the speed or less, "No" is determined in Step S48, and the process proceeds to Step S47. On the other hand, in a case where the minimum value of the X-axis direction speed is the threshold of the speed or less, "Yes" is determined in Step S48, and the process proceeds to Step S49.

In Step S49, the half detecting unit 56 detects center between the zero-cross position of the angle around the Z axis and the minimum value position of the X-axis direction speed as a half position. After Step S49, the process is returned to the motion analyzing process.

Figure 15:
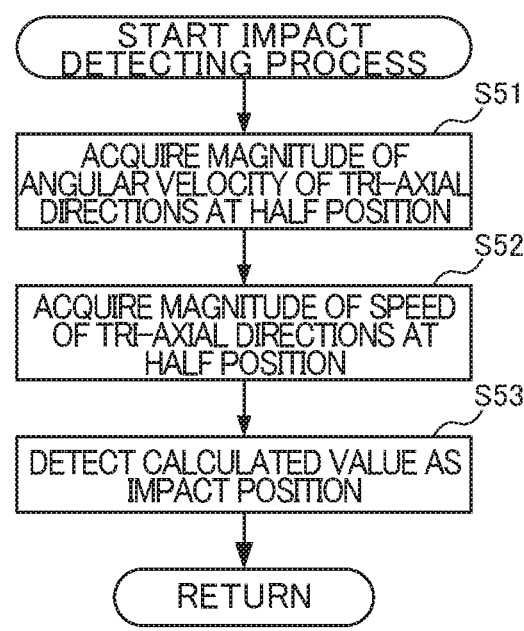
FIG. 15 is a flowchart that describes the flow of an impact detecting process.

Next, the impact detecting process performed in Step S7 of the motion analyzing process will be described. FIG. 15 is a flowchart that describes the flow of an impact detecting process. In Step S51, the impact detecting unit 57 acquires the magnitude (GyrN) of the angular velocity of each of the tri-axial directions at the half position detected by the half detecting unit 56.

In Step S52, the impact detecting unit 57 acquires the magnitude (VelocityN) of the speed of each of the tri-axial directions at the half position detected by the half detecting unit 56. In Step S53, the impact detecting unit 57 detects a value calculated using Equation (1) as an impact position. After Step S53, the process is returned to the motion analyzing process.

According to such a process, by mounting the motion analyzing apparatus 1 on a mounting target, the operation of the mounting target can be accurately specified and analyzed from the sensor information acquired by sensing the operation of the mounting target. For example, sensor values at distinctive five points of a golf swing and times between the five points can be compared with those of the person having the motion analyzing apparatus mounted in the past and those of other persons, and the motion analyzing apparatus can contribute to the improvement of swing technologies. In other words, according to the motion analyzing apparatus 1, without using a time point at which the momentum takes a maximum value or a minimum value as the reference, a series of operations of a target person can be analyzed more appropriately. In addition, in this embodiment, the analysis based on the sensor information may be performed not only by the motion analyzing apparatus 1 but also by other apparatuses such as a smartphone, a server, and the like. Furthermore, an analysis result acquired by the analysis performed by the motion analyzing apparatus 1 may be configured to be displayed by another apparatus. In addition, by associating the motion analyzing apparatus 1 and another apparatus capturing an image of an mounting target or the like, an analysis result acquired by the motion analyzing apparatus 1 and an analysis of an operation using a captured image, and the like may be integrated and presented.

The motion analyzing apparatus 1 configured as above includes the data acquiring unit 51, the top detecting unit 52, the address detecting unit 53, the finish detecting unit 54, the axis correcting unit 55, the half detecting unit 56, and the impact detecting unit 57. The data acquiring unit 51 acquires motion information including an operation direction in a series of operations of a target object measured by the sensor unit. The address detecting unit 53 or the finish detecting unit 54 specifies a start time point or an end time point of a series of operations by using a specific time point at which the operation direction of the target object is reversed in the motion information acquired by the data acquiring unit 51. Accordingly, the start time point or the end time point of the series of operations can be specified by using a clear change in the motion. Therefore, a series of operations performed by a target person can be analyzed more appropriately without using a time point at which the momentum takes a maximum or minimum value as the reference.

The motion information includes information of the angular velocity. The address detecting unit 53 specifies a time point at which the angular velocity takes a value close to zero at a time point before a specific time point in the motion information as a start point of the operation. In this way, an appropriate time point based on the characteristic of the motion of a target person can be specified as a start point of the operation.

The top detecting unit 52 specifies a specific time point from near a time point at which the angular velocity takes a negative value at a time point before a time point at which the angular velocity has a maximum value in the motion information. In this way, a time point that is appropriate based on the characteristic of the motion of the target person can be specified as a specific time point.

The motion information further includes information of acceleration of a target person. The half detecting unit 56 specifies a time point of a distinctive operation in the motion information from between a time point at which an angle based on the information of the angular velocity is near zero and a time point at which the magnitude of the speed based on the information of the acceleration takes a maximum value in the motion information. In this way, a time point of a distinctive operation can be specified from an appropriate range in the motion of a target person.

In addition, the present invention is not limited to the embodiment described above, and modifications and improvements, and the like in a range in which the object of the present invention can be achieved belong to the present invention.

In the embodiment described above, while a case where the motion analyzing apparatus 1 is mounted on a mounting target performing a golf swing, and the golf swing is analyzed has been described, the present invention is not limited thereto. The motion analyzing apparatus 1 according to the present invention may be used for each operation having a predetermined pattern and the like such as a baseball game, a tennis game, an athletic game, and the like. For example, the motion analyzing apparatus 1 according to the present invention can be used for a batter swinging at the batter's box, a pitcher pitching on a mound, a tennis player performing a stroke, a service, or the like, and a player performing throwing in an athletic game as targets.

The present invention can be applied to electronic devices in general which have information processing function. Specifically, for example, the present invention can be applied to a notebook type personal computer, a printer, a television set, a video camera, a portable navigation device, a mobile phone, a portable game device and the like.

In addition, in the embodiment described above, while a series of operations of a target and each operation within the series of operations are configured to be specified by the analysis function of the motion analyzing apparatus 1, the present invention is not limited thereto. For example, a configuration may be employed in which sensor information is transmitted to an external apparatus by using a communication function, and the external apparatus performs the analysis process described above.

The processing sequence described above can be executed by hardware, and can also be executed by software. In other words, the hardware configuration of FIG. 4 is merely an illustrative example, and the present invention is not particularly limited thereto. More specifically, the types of functional blocks employed to realize the above-described functions are not particularly limited to the examples shown in FIG. 4, so long as the motion analyzing apparatus 1 can be provided with the functions enabling the aforementioned processing sequence to be executed in its entirety. A single functional block may be configured by a single piece of hardware, a single installation of software, or a combination thereof. The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or recording medium to a computer or the like. The computer may be a computer equipped with dedicated hardware. In addition, the computer may be a computer capable of executing various functions, e.g., a general purpose personal computer, by installing various programs.

The storage medium containing such a program can not only be constituted by the removable medium 31 of FIG. 3 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 12 of FIG. 3 in which the program is recorded or a hard disk, etc. included in the storage unit 19 of FIG. 3.

It should be noted that, in the present specification, the steps defining the program recorded in the storage medium include not only the processing executed in a time series following this order, but also processing executed in parallel or individually, which is not necessarily executed in a time series. Further, in the present specification, the terminology of the system means an entire apparatus including a plurality of apparatuses and a plurality of units.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. A motion analyzing apparatus comprising:
a processor,
wherein the processor executes:
a motion information acquiring process acquiring motion information in a series of operations of a target object measured by a sensor unit, the motion information including information of (i) an operation direction of the target object, (ii) an angular velocity of the target object, and (iii) an acceleration of the target object;
a specific time point acquiring process acquiring a specific time point at which the operation direction is reversed in the motion information acquired in the motion information acquiring process; and
a specifying process specifying (i) one of a start time point and an end time point of the series of operations based on the specific time point, (ii) a time point at which the angular velocity takes a value close to zero at a time point before the specific time point in the motion information, and (iii) a time point of a distinctive operation in the motion information from between a time point at which an angle based on the information of the angular velocity is near zero and a time point at which a magnitude of speed based on the information of acceleration takes a maximum value in the motion information.

2. The motion analyzing apparatus according to claim 1, wherein the specific time point acquiring process acquires, as the specific time point, a time point near a time point at which the angular velocity takes a negative value before a time point at which the angular velocity has a maximum value in the motion information.

3. A motion analyzing method performed under control of a processor of a motion analyzing apparatus, the motion analyzing method comprising:
a motion information acquiring process acquiring motion information in a series of operations of a target object measured by a sensor unit, the motion information including information of (i) an operation direction of the target object, (ii) an angular velocity of the target object, and (iii) an acceleration of the target object;
a specific time point acquiring process acquiring a specific time point at which the operation direction is reversed in the motion information acquired in the motion information acquiring process; and
a specifying process specifying (i) one of a start time point and an end time point of the series of operations based on the specific time point, (ii) a time point at which the angular velocity takes a value close to zero at a time point before the specific time point in the motion information, and (iii) a time point of a distinctive operation in the motion information from between a time point at which an angle based on the information of the angular velocity is near zero and a time point at which a magnitude of speed based on the information of acceleration takes a maximum value in the motion information.

4. The motion analyzing method according to claim 3, wherein the specific time point acquiring process acquires, as the specific time point, a time point near a time point at which the angular velocity takes a negative value before a time point at which the angular velocity has a maximum value in the motion information.

5. A non-transitory computer-readable recording medium having a program for controlling a motion analyzing apparatus stored thereon, the program controlling a processor of the motion analyzing apparatus to execute processes comprising:
a motion information acquiring process acquiring motion information in a series of operations of a target object measured by a sensor unit, the motion information including information of (i) an operation direction of the target object, (ii) an angular velocity of the target object, and (iii) an acceleration of the target object;

a specific time point acquiring process acquiring a specific time point at which the operation direction is reversed in the motion information acquired in the motion information acquiring process; and a specifying process specifying (i) one of a start time point and an end time point of the series of operations by using based on the specific time point, (ii) a time point at which the angular velocity takes a value close to zero at a time point before the specific time point in the motion information, and (iii) a time point of a distinctive operation in the motion information from between a time point at which an angle based on the information of the angular velocity is near zero and a time point at which a magnitude of speed based on the information of acceleration takes a maximum value in the motion information.

6. The recording medium according to claim 5, wherein the specific time point acquiring process acquires, as the specific time point, a time point near a time point at which the angular velocity takes a negative value before a time point at which the angular velocity has a maximum value in the motion information.

* * * * *

UNITED STATES PATENT AND TRADEMARK OFFICE
CERTIFICATE OF CORRECTION

PATENT NO. : 10,569,136 B2
APPLICATION NO. : 15/832435
DATED : February 25, 2020
INVENTOR(S) : Tomoaki Nagasaka Page 1 of 1

It is certified that error appears in the above-identified patent and that said Letters Patent is hereby corrected as shown below:

Column 13, Lines 6-7, Claim 5, after "operations" delete "by using".

Signed and Sealed this
Twenty-third Day of June, 2020

Andrei Iancu
*Director of the United States Patent and Trademark Office*